Patented June 12, 1945

2,378,230

UNITED STATES PATENT OFFICE 2,378,230

RESIN DISPERSIONS AND METHOD OF PRODUCING

Julius G. Little, Wilmington, Del., assignor to Hercules Powder Company, Wilmington, Del., a corporation of Delaware No Drawing. Application February 18, 1941, Serial No. 379,484

2 Claims. (Cl. 260—31)

This invention relates to a method of dispersing insoluble, gelled, polycarboxylic acid-polyhydric alcohol resins in organic solvents and to the dispersion so obtained.

A wide variety of polycarboxylic acid-polyhydric alcohol resins have been described and used in the art. In most applications of these resins it has been customary to dissolve the resin in a suitable solvent. Resins of relatively high acidity have been dissolved in aqueous media by means of alkaline reagents, such as ammonia. Such use of the resins, however, has been limited to resins which are soluble in organic solvents and which are fusible and ungelled.

While it has been well recognized in the art that the polycarboxylic acid-polyhydric alcohol resins exhibit superior film properties in their infusible and gelled state as compared with the fusible and ungelled forms, no satisfactory means of utilizing these resins in such preferred form has been available. The only satisfactory means of achieving films of the infusible and gelled resins has involved application of the resins infusible and ungelled form to, for example, a surface and then subjecting the film to a suitable heat treatment or oxygen treatment to convert the resin to the infusible and insoluble form. Such practice is made use of in the baked alkyd resin finishes.

Some attempts have been made in the past to solubilize infusible and gelled polycarboxylic acid-polyhydric alcohol resins but such procedures have not met with any success. Thus heat-convertible polycarboxylic acid-polyhydric alcohol resins have been dissolved in high boiling solvents just prior to the conversion to the gelled state and subjected to heating in the solvent to effect gelation of the resin. The gelled resin becomes intimately dispersed in the high boiling liquid. The solvents which have been used in this manner have been esters such as diethyl phthalate, diethyl oxalate, glycol diacetate, etc. Also, it has been known to heat the gelled resins themselves in high boiling solvents for a sufficient time to effect a re-esterification reaction leading to solubilization of the resin. After such a procedure the gelled resin has undergone a transformation to a soluble and ungelled state and, therefore, no longer possesses the desirable advantages of the resins in the insoluble and gelled form.

It is an object of this invention to provide a means of solubilizing polycarboxylic acid-polyhydric alcohol resins which have been converted to the insoluble gelled condition. It is a further object to provide a method of dispersing insoluble, gelled, polycarboxylic acid-polyhydric alcohol resins in organic solvents which are normally solvents for the resin the fusible and ungelled state. It is another object to provide dispersions of infusible, gelled, polycarboxylic acid-polyhydric alcohol resins in organic solvents in which the resins are normally soluble in the fusible and ungelled state. Other objects of the invention will appear hereinafter.

The above objects may be accomplished in accordance with this invention by dispersing an insoluble, gelled, polycarboxylic acid-polyhydric alcohol resin in an organic solvent which is normally a solvent for the ungelled resin by means of an organic amine as a dispersing agent. It has been found that such amines when present in small amount in the gelled resin or in the solvent in which the resin is to be dispersed exert a unique action on the resins and make it possible to disperse the resins in the solvent to provide homogeneous, clear dispersions resembling true solutions of the resins. It has also been found that such dispersions deposit films which possess the desirable characteristics of gelled resins in general. Thus the films deposited from the dispersions exhibit increased hardness, increased tensile strength, and increased solvent resistance in comparison with films of the same resins deposited from solutions of the resins in the ungelled state.

The resins which may be used in the practice of this invention comprise any of the broad class of heat-convertible polycarboxylic acid-polyhydric alcohol resins including both the modified and the unmodified types. Thus the polycarboxylic acids which may be utilized in the production of the resins will include such acids as phthalic acid or anhydride, maleic acid or anhydride, adipic acid, sebacic acid, terpene-maleic anhydride condensates such as the condensates obtained by reaction of maleic anhydride with various terpenes as terpinene, pinene, terpinolene, dipentene, limonene, or by reaction of maleic anhydride with various terpene cuts containing these and other terpenes in admixture. The alcohols which may be used are those commonly used in the art and will include glycerol, pentaerythritol, ethylene glycol, propylene glycol, diethylene glycol, triethylene glycol, tetraethylene glycol, trimethylene glycol, etc. The modifiers used in the production of the resins may include monobasic acids such as the various acids contained in non-drying, semi-drying, and drying oils, the various rosin acids and the rosins themselves, etc. It will be appreciated that with certain of the polycarboxylic acids reaction with dihydric alcohols such as the various glycols will not provide heat-convertible resins but that the present invention is limited to the resin constituents which provide the heat-convertible type of product.

The amines used in practicing this invention include any of the primary, secondary, or tertiary amines as well as the ethanolamines. Thus they include such amines as ethylamine, isopropylamine, butylamine, amylamine, monoisopropanolamine, triethylenetetramine, diethylenetriamine, monoethanolamine, ethylenediamine, diethanolamine, morpholine, triethanolamine, pyridine, etc. The amount of the amine necessary to provide the aqueous dispersion of the gelled resin will depend to a certain extent on the particular amine employed and on the degree of gelation of the resin. An amount of amine up to about 25% by weight based on the weight of gelled resin may be used but preferably the amount will be within the range of about 0.1% to about 10% by weight based on the weight of the gelled resin.

The organic solvents which may be utilized in providing the dispersions of the gelled, insoluble resins will include any of the solvents in which the resin in the ungelled and soluble state is soluble. The process does not appear to be limited to any particular type of solvent beyond this limitation. Thus the solvents will include coal tar hydrocarbons as benzol, toluol, xylol; hydroaromatic solvents as solvent naphtha, Solvesso solvents (petroleum hydrocarbon mixtures rich in cyclic hydrocarbons); esters as ethyl acetate, butyl acetate, Ethyl Cellosolve, Butyl Cellosolve, etc.; alcohols as ethyl alcohol, propyl alcohol, butyl alcohol, etc.; chlorinated solvents as chloroform, dichloroethylene, etc.

In carrying out the process of the invention the gelled, insoluble resin may be added to the solvent containing the amine or the amine may be added to the mixture of the resin and solvent. Alternatively, the amine may first be added to the gelled, insoluble resin and the mixture then dispersed in the solvent. The dispersion may be carried out either at room temperature or at elevated temperature. It will be found desirable to effect the dispersion by heating the mixture at the reflux point of the solvent. In this manner a more rapid dispersion may be obtained. The amount of solvent used in producing the dispersion is not critical and may be controlled so as to provide the desired viscosity in the final dispersion. Thus the concentration in any particular case will depend on the resin being dispersed and on the particular solvent used. Generally speaking, a concentration of dispersed resin up to about 80% by weight is contemplated.

The non-aqueous dispersions of gelled, polycarboxylic acid-polyhydric alcohol resins prepared in accordance with this invention are adapted to a wide variety of interesting uses. If desired, the dispersions may be further dispersed in aqueous media to provide stable aqueous dispersions of the gelled resins. In many instances the use of the gelled resins in the form of aqueous dispersions is more practical than in the form of the dispersions in organic solvents. The production of aqueous dispersions from the organic solvent dispersions of the gelled resins may be accomplished by treating the organic solvent dispersion with water and an alkaline material capable of forming a water-soluble salt with the resin. Thus the organic solvent dispersion of the gelled resin may be dispersed in water with use of alkaline materials as ammonium hydroxide, sodium hydroxide, potassium hydroxide, organic amines as ethylamine, propylamine, butylamine, ethylenediamine, morpholine, triethanolamine, etc. Aqueous dispersions may also be prepared by use of emulsifying agents as sodium lauryl sulfate, sodium stearyl sulfate, sulfonated castor oil, etc.

The organic solvent dispersions of the gelled resins or the aqueous dispersions of the resins will be found useful in providing decorative and protective coatings for surfaces either when used alone or when used in combination with film-forming materials as chlorinated rubber, nitrocellulose, ethyl cellulose, etc. Such coatings may also include any of the various pigments if desired. The dispersions are also useful as binders for inert fillers, pigments, and dyes in the coating of paper or textiles as well as in the printing of such materials. The emulsions are also useful in the sizing of various woven fabrics such as textile fabrics, rugs, etc. When used to impregnate rug fabrics the dispersions provide a highly desirable type of binding action on the tufts. In the finishing of fabrics for use as wearing apparel, the dispersions provide crease-resistance in the fabrics. In the finishing of woolens the dispersions impart high resiliency to the cheaper types of wool structures such as short fibers, shodding, etc., for suitings. As a finishing for cotton structures they impart resiliency and wear resistance. When used to finish rayon they impart resiliency and also prevent slippage of the rayon fibers, thus retaining the original structure of the material. The dispersions provide desirable carriers in textile printing pastes for both water-soluble dyestuffs and for pigments. The aqueous dispersions of the organic solvent solutions may be used with water-soluble or water-dispersible, film-forming materials such as casein, starch, glue, albumen, latex, methyl cellulose, etc., to provide an improved type of adhesive composition or protective coating composition. Furthermore, the dispersions may be used in greases and lubricating oils in the same manner in which aluminum stearate is now used. Other uses of these novel dispersions of insoluble, gelled, polycarboxylic acid-polyhydric alcohol resins will be apparent to those skilled in the art after examination of the characteristics of the dispersions.

As illustrative of the production of the dispersions in accordance with this invention the following examples may be cited as typical. The proportions included in the examples represent parts by weight unless otherwise indicated.

Example I

A gelled resin was prepared by heating 400 parts of phthalic anhydride with 230 parts of glycerol at a temperature of 210–225° C. for 3 hours. After this period of heating the resin was infusible and insoluble in the solvents which dissolve the resin in the ungelled state. Forty parts of the gelled resin were added to 56 parts of Butyl Cellosolve and the mixture treated with 4 parts of morpholine by heating at reflux temperature for 2 hours. The resin became completely dispersed in the Butyl Cellosolve solvent to give a clear, transparent solution. Heating of the same resin with Butyl Cellosolve under the same heating conditions but without the morpholine merely swelled the resin but did not dissolve it.

Example II

A fusible resin was prepared by heating 139 parts of maleic anhydride with 769 parts of N wood rosin to 230° C., and 194 parts of glycerol were then added and the mixture heated at a temperature of 270-275° C. for about 7 hours whereupon a resin having an acid number of 27, a color of 65 Amber and a drop melting point of 170° C. was obtained. The resin was soluble in organic solvents at this stage. It was heated at a temperature of 240-260° C. for an additional 30 minutes whereupon the resin became gelled, infusible and insoluble in organic solvents. The gelled resin was dispersed in toluol by agitating a mixture of 5 parts of the gelled resin with 10 parts of toluol and 1.5 parts of triethylenetramine at room temperature for 24 hours. A similar dispersion was made using Solvesso No. 2 (a petroleum hydrocarbon mixture rich in cyclic hydrocarbons) as the solvent and diethylenetriamine as the dispersing agent. Without the presence of the amines a dispersion was impossible by agitating the resin with either solvent.

Example III

A drying oil fatty acid resin was prepared by heating 753 parts of a terpene-maleic anhydride condensate produced by reaction of maleic anhydride with a terpene cut boiling at 182-190° C., 482 parts of "Isoline" fatty acids (dehydrated castor oil fatty acids), 550 parts of Baker's No. 304 castor oil, and 460 parts of glycerol at a temperature of 200-250° C. until a resin having an acid number of 10 resulted. The resin in the fusible state was then heated further in a carbon dioxide atmosphere at a temperature of 240-260° C. for about 2 hours to give a rubbery, tacky, gelled resin. Forty-five parts of the gelled resin were then heated with 55 parts of Hi-Flash Naphtha containing 1 part of monoethanolamine under reflux for about 2.5 hours to provide a clear, transparent dispersion of the resin in the solvent.

Example IV

A resin was prepared by heating 116 parts of the condensation product of maleic anhydride with a terpene cut boiling at 182-190° C. as described in U. S. Patent 1,993,031 with 62 parts of diethylene glycol to provide a fusible resin having an acid number of 37.5 and a drop melting point of 65° C. This resin was then heated slowly to a temperature of 255° C. and maintained at this temperature for about 1 hour. As a result of this heating the fusible resin became converted from a fluid state to an infusible mass which was insoluble in all solvents. To 885 parts of the gelled resin at a temperature of 150° C., 35 parts of morpholine were added gradually and the mixture dispersed in 250 parts of xylene by stirring. A viscous homogeneous solution resulted which could be diluted infinitely with xylene.

Example V

A resin was prepared by heating 1720 parts of the terpene-maleic anhydride condensate used in Example III, 178 parts of ethylene glycol, 356 parts of diethylene glycol and 450 parts of triethylene glycol for about 7 hours at a temperature of 220° C. to provide a fusible resin having an acid number of 38.5 and a drop melting point of 62° C. This resin was then subjected to a further heat treatment at 230-240° C. with stirring. A completely gelled resin was formed after 35 minutes heating at this temperature. The gelled resin was then mixed with toluol and butylamine in the proportion of 58.5 parts resin, 1.5 parts butylamine, and 40 parts toluol and the mixture heated under reflux for 4.5 hours. A complete solution of the resin in the solvent took place. By heating the same resin with the same amount of toluol without the butylamine for 6 hours under reflux the solvent after such heating was found to contain only 4.4% of dissolved solids, thereby indicating the effect of the amine in promoting solution of the gelled resin.

Example VI

A resin was prepared by heating 60 parts of the terpene-maleic anhydride condensate used in Example III with 69 parts of linseed oil fatty acids and 27 parts of glycerol at a temperature of 220° C for about 5 hours whereupon a resin having an acid number of 26 and a drop melting point of 34.5° C. was obtained. This fusible resin was then converted into an insoluble gel by heating at a temperature of 230-240° C. for about 30 minutes. The rubbery, infusible gel was then refluxed for 3½ hours with toluol and butylamine in the proportions of 50 parts gelled resin, 4 parts butylamine and 46 parts toluol. A clear, transparent solution of the gelled resin resulted.

Example VII

Seventy-five parts of the gelled resin used in Example IV were heated with 20 parts of butanol and 1.5 parts of morpholine under reflux for about 4 hours to form a clear solution of the gelled resin. One hundred parts of this solution were then dispersed in 142 parts of water containing 4 parts of 28% ammonium hydroxide by simple agitation. A clear, transparent aqueous dispersion resulted.

Example VIII

The xylene dispersion of the resin produced from diethylene glycol and the terpene-maleic anhydride condensate described in Example IV was dispersed in water by diluting 348 parts of the xylene dispersion with 132 parts of additional xylene and adding this solution to 810 parts of water containing 0.8 part Duponol ME (sodium lauryl sulphate) and 2 parts of sulfonated castor oil. The dispersion was stabilized by passage through a homogenizer, yielding a stable emulsion.

It will be understood that the details and examples hereinbefore set forth are illustrative only and that the invention as broadly described and claimed is in no way limited thereby.

What I claim and desire to protect by Letters Patent is:

1. A dispersion comprising an insoluble, gelled, resinous reaction product of a terpene-maleic anhydride and a glycol dispersed in an organic solvent which is normally a solvent for the ungelled resin and morpholine as dispersing agent.

2. A dispersion comprising an insoluble, gelled, polycarboxylic acid-polyhydric alcohol resin dispersed in an organic solvent which is normally a solvent for the ungelled resin and morpholine as dispersing agent.

JULIUS G. LITTLE.